Inventors
Arthur J. Schutt &
William J. deBeaubien
By Blackmore, Spencer & Flint
Attorneys

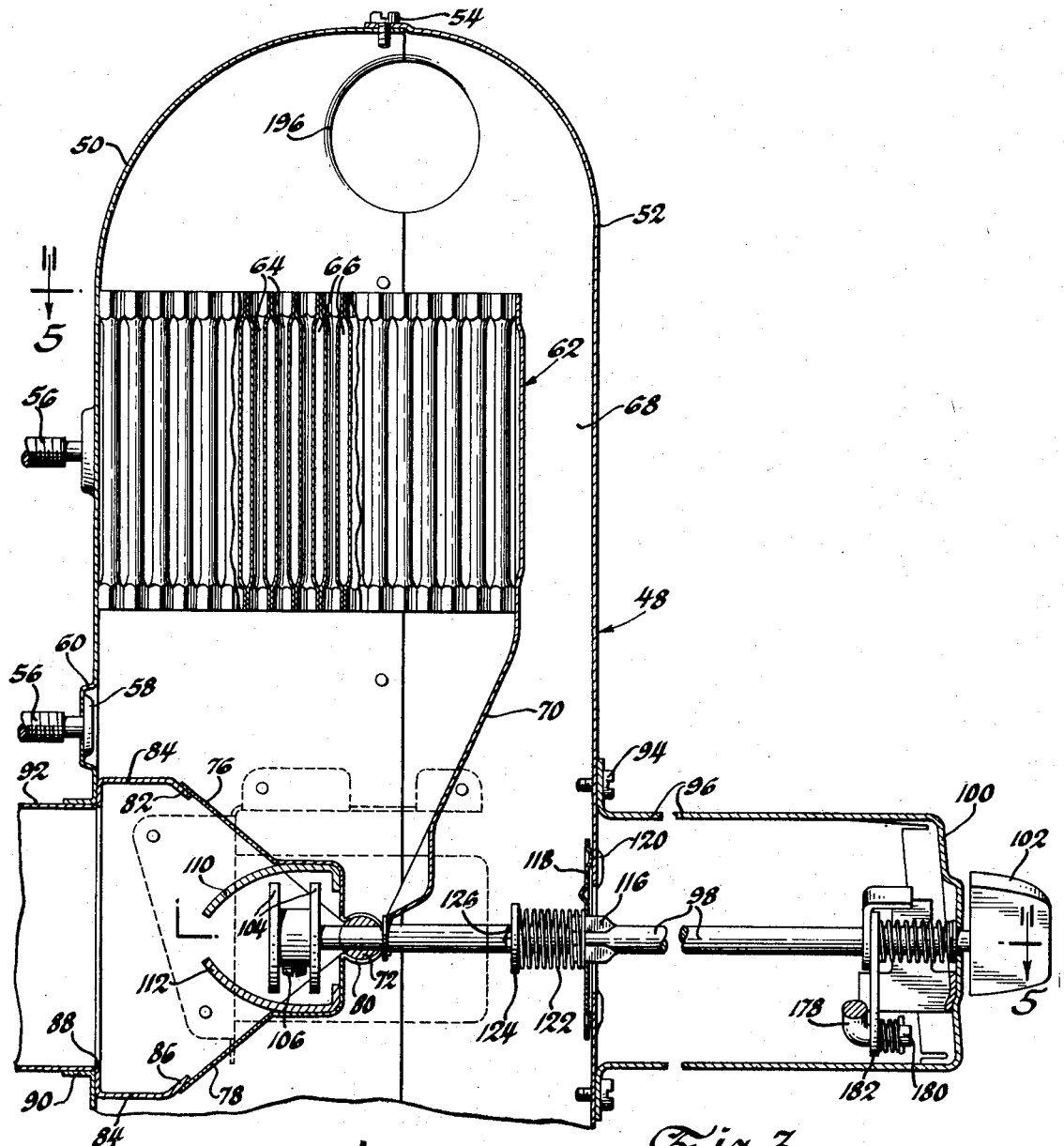
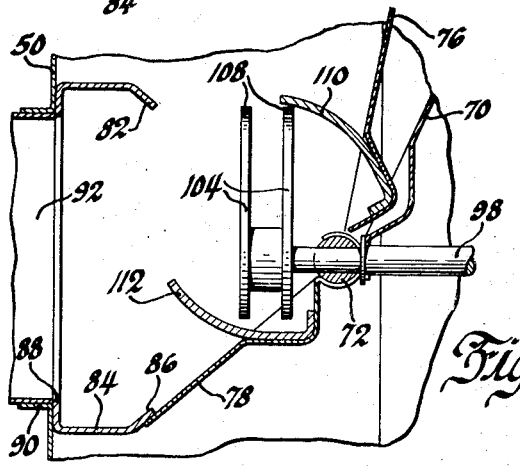

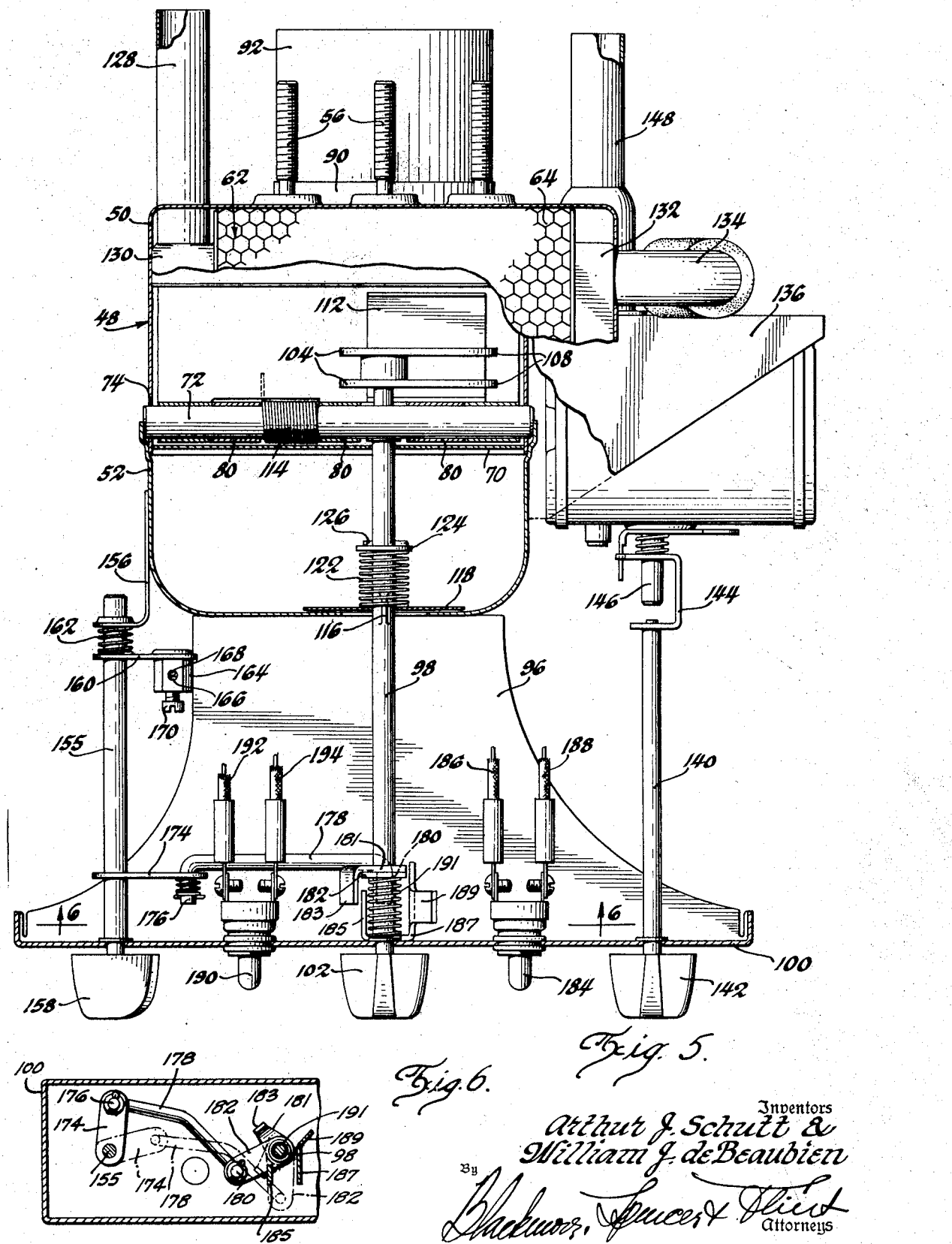

Patented Feb. 29, 1944

2,342,901

UNITED STATES PATENT OFFICE 2,342,901

CAR HEATER AND WINDSHIELD DEFROSTER

Arthur J. Schutt, Lockport, N. Y., and William J. de Beaubien, Pontiac, Mich., assignors to General Motors Corporation, Detroit, Mich., a corporation of Delaware Application September 26, 1942, Serial No. 459,844

4 Claims. (Cl. 237—12.3)

This invention relates to heating, defrosting and ventilating devices for motor vehicles, and has for an object the provision of such a device wherein air taken from outside the vehicle through a tube having its inlet located at the front end thereof may be discharged into the body compartment either through a heat radiating member located under one of the seats or through a casing mounted under the cowl, there being conduits leading from the casing to discharge openings located at the lower inside edge of the windshield. A second heat radiating member is provided inside the casing, and an adjustable damper arrangement makes it possible to cause the air entering the casing to flow through the heat radiating member before being discharged through the conduits for windshield defrosting or ventilating purposes, or if unheated air is preferred for these purposes, the air entering the casing may be caused to flow directly therethrough without passing through the heat radiating member. Both of the heat radiating members are heated by liquid from the engine cooling circulating systems, and valve means actuated by a temperature responsive device located within the body compartment serves to control the rate of flow of such liquid to make it possible to maintain the temperature of the air within the body at any desired point, this point being variable by adjusting the position of a regulating member. The amount of air flowing into the underseat heater may be varied or cut off entirely by adjusting the position of a valve located in the air tube. Under ordinary driving conditions, sufficient air for heating and defrosting or ventilating purposes will be forced into the inlet end of the tube by the forward movement of the vehicle, but a blower is provided to force air into the tube when the vehicle is standing still or is moving slowly, or whenever more air is desired for heating.

Other objects and advantages of the invention will appear upon reference to the specification and accompanying drawings, in which:

Figure 3 is a sectional view, taken on the line 3—3 of Figure 2.

Figure 4 is a fragmentary sectional view of a portion of the structure shown in Figure 3, but showing the parts adjusted to a different position.

Figure 5 is a sectional view, taken on the line 5—5 of Figure 3.

Figure 6 is a fragmentary sectional view, taken on the line 6—6 of Figure 5.

Figure 1:
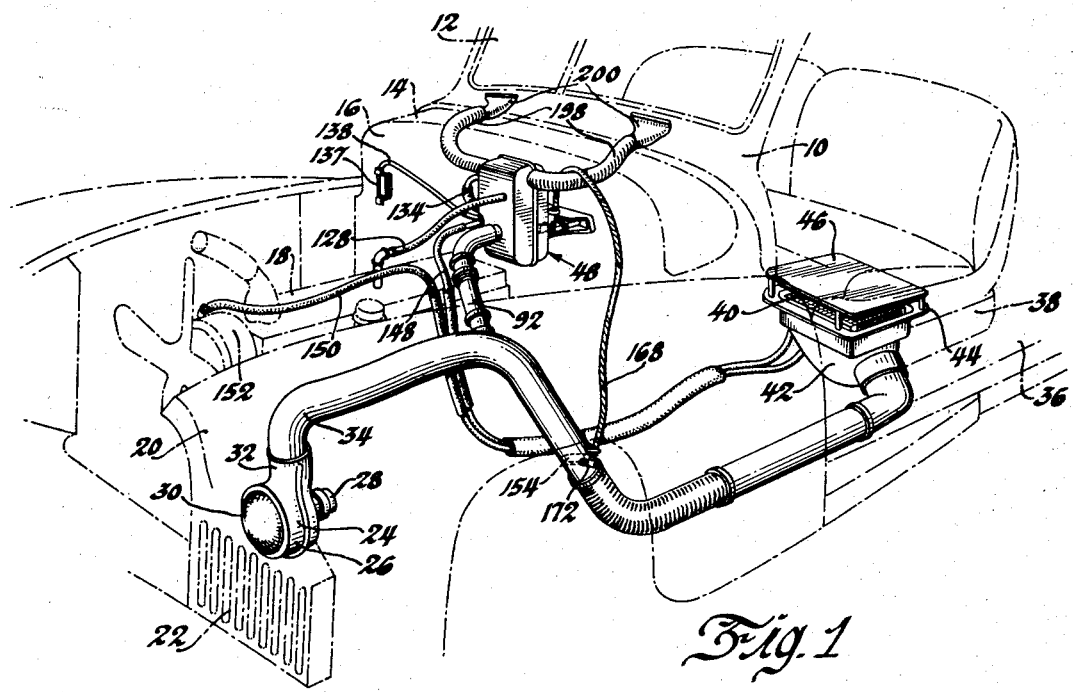
Figure 1 is a perspective view of a motor vehicle, taken from a point at the front and left hand side thereof, showing the outline of the vehicle in dot-and-dash lines, and our improved heating and ventilating apparatus, which is associated therewith, in full lines.

The reference numeral 10 indicates the body of a motor vehicle having windshield sections 12, a cowl 14, and a dashboard 16 which separates the body compartment from the engine compartment. 18 is the engine, 20 are the front fenders and 22 is a grille located in the front face of the left hand fender, this grille being positioned near the lower edge of the fender and having vertically extending slots formed through it.

Located under the fender and in back of the grille 22 is a housing 24 containing a blower 26 adapted to be driven by an electric motor 28, the inlet opening to the blower being covered by a screen 30. Connected to the outlet 32 of the blower housing is a tube 34 of relatively large diameter which extends rearwardly under the fender and is inclined downwardly adjacent the dashboard in order that it may pass under the floor 36 of the vehicle. Positioned under the front seat 38 is a heat radiating member 40 of any of the well-known constructions having vertically extending air passages located between tubes or channels adapted to have hot water from the engine cooling system circulated through them.

The heat radiating member 40 is mounted within a casing 42 which extends downwardly through an opening in the vehicle floor, being supported in the opening by an outwardly projecting flange 44 which rests on top of and is secured to the floor. The rearward end of the tube 34 is connected to the lower portion of the casing so that air flowing through the tube will be forced into the casing and will flow upwardly through the vertically extending air passages in the member 40, becoming heated thereby and being discharged against a horizontally extending plate 46 spaced above the heat radiating member, which causes it to flow forwardly and rearwardly into the spaces in front of and behind the front seat.

Mounted upon the dashboard 16 under the cowl 14 is a casing 48, which for convenience of manufacture is formed of two sections 50 and 52 connected together by screws 54. Bolts 56, having their heads 58 secured in depressed portions 88 formed in the section 50, extend through holes in the dashboard to secure the casing 48 thereto.

Located in the casing 48 is a heat radiating member 62 of any of the well-known types having vertically extending air passages 64 located between tubes or channels 66 adapted to have hot water from the engine cooling system circulated through them. The heat radiating member 62 is spaced from the center wall of the section 52 of the casing to form a passageway 68, the purpose of which will be described presently. Extending downwardly from the heat radiating member 62 is a partition 70 which at its lower end terminates along side of a rod 72 which, as shown in Figure 5, extends transversely across the casing and is supported at its ends in holes 74 formed in the section 50 of the casing.

Pivotally supported on the rod 72 is an upper damper 76 and a lower damper 78, both of these dampers extending all the way across the casing and being movable independently of each other. These dampers are supported on the rod by bearing portions 80 which are bent around the rod. As shown in Figure 3 the upper damper 76 when in closed position seats against a downwardly inclined flange 82 extending from a member 84 secured to the section 50 of the casing, while the lower damper 78 when closed seats against an upwardly inclined flange 86 extending from the member 84. The latter has a circular opening 88 formed in it which registers with an opening formed in the center wall of the section 50 of the casing, there being a flange 90 formed around the latter opening, within which flange is received a tube 92 which extends through the dashboard and down to the tube 34, into which it is connected so that some of the air flowing through the tube 34 may flow upwardly into the casing 48.

Secured to the section 52 of the casing 48 by screws 94 is a control housing 96, which extends rearwardly in the car to a point wherein the end wall of the housing, which will be termed a face plate, lies under the instrument panel in order that the handles of the controls may be easily accessible to the vehicle operator. One of the controls supported in this housing is that for adjusting the position of the dampers 76 and 78. This consists of a shaft 98 which is supported at one end in the face plate 100 of the housing 96, and the other end extends through a hole formed in the rod 72, being journalled therein. A control knob 102 is secured to the outer end of the shaft, while a double lobed cam 104 is fastened to the other end by a set screw 106. Rotation of the shaft 98 in one direction by the knob 102 causes the nose portions 108 of the double cam to engage a curved member 110 secured to the damper 76, resulting in that damper being moved to open position, as shown in Figure 4. Rotation of the shaft in the other direction causes the nose portions of the cam to engage a curved member 112 secured to the damper 78, thus opening that member. A coil spring 114 extending around the rod 72 between bearing portions 80 of the dampers 76 and 78 is connected to the two dampers in such manner as to hold them against the cam at all times, thus returning the dampers to closed position after the cam has been turned back and also serving to prevent rattling of the dampers at the points where they are supported upon the rod 72.

To hold the shaft 98 in adjusted position, the following structure is provided. The shaft has flattened portions 116 formed on it, and 118 is a washer having a central opening cut to conform with the shape of the flattened portions so that the washer will turn with the shaft. This washer has projections formed on it which are adapted to be received in depressions 120 formed in the central wall of the casing section 52, and a compression spring 122, seating against a washer 124 which is retained against movement on the shaft by a cotter pin 126, holds the washer 118 against the wall of the casing section so that the projections on the washer will be held in the depressions 120 to positively hold the shaft in the position to which it has been adjusted.

Referring to Figures 1 and 5, hot water from the engine cooling circulating system flows through the pipe 128 into the inlet header 130 at one side of the heat transfer member 62 and then flows horizontally across the latter through the tubes or channels 66 into the outlet header 132 from which it is conducted downwardly through a pipe 134 into a housing 136 in which is located a valve for automatically controlling the flow of the water in proportion to the temperature of the air inside the body compartment of the vehicle. Since the construction of this valve forms no part of the present invention, it will not be described in detail, but it will suffice to state that it is actuated by the expansion or contraction of a volatile fluid contained in a bulb 137 located at any desired point in the vehicle body compartment, such as on the dashboard under the cowl, as shown in Figure 1, this bulb being connected to the operating part of the valve by a capillary tube 138. It will be understood that as the temperature inside the body compartment rises, the fluid expands and this expansion tends to close the valve to reduce or cut off entirely the flow of hot water.

Figure 2:
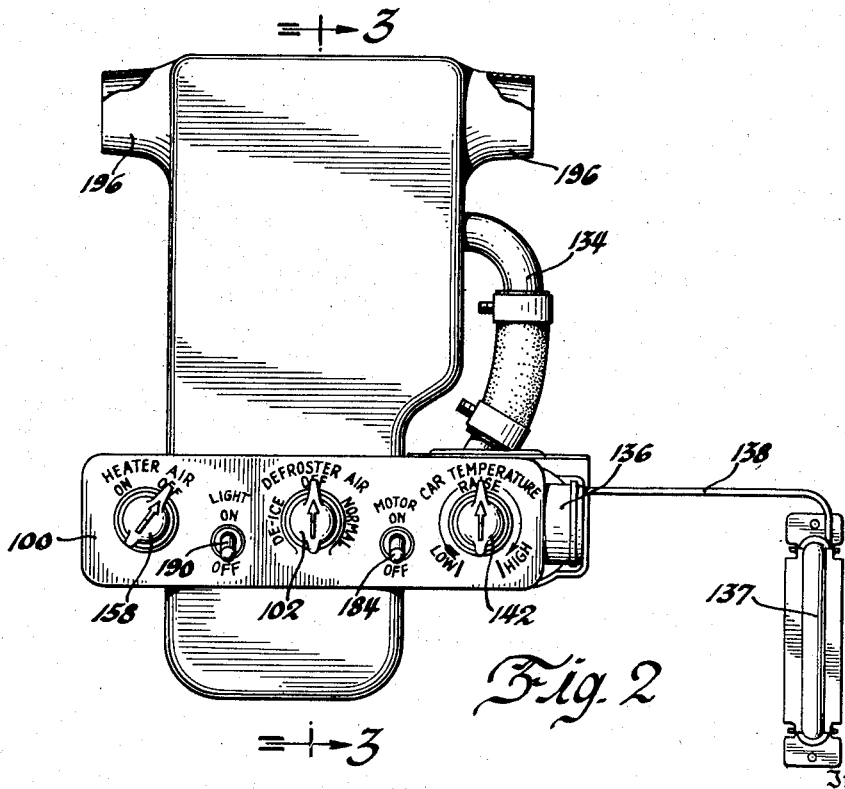
Figure 2 is a face view of a housing which is located inside the car body underneath the cowl thereof, with which housing the controls for the heating and ventilating apparatus are associated.

To control the point at which the valve will be operated to reduce or cut off the flow of the hot water, an adjustment is provided, this consisting of a shaft 140 which is supported in the face plate 100 of the housing 96, there being a control knob 142 secured on this end of the shaft. To the other end of the shaft is connected one leg of a U-shaped member 144, the other leg of this member being secured to a shaft 146 which extends from the valve housing 136. Rotation of the shaft 140 by the knob 142 causes the shaft 146 to be rotated and this varies the point at which the expansible fluid will start to close the valve to reduce or cut off the flow of hot water through the heat radiating member 62. In other words, as indicated in Figure 2, moving the knob 142 in a clockwise direction will change the setting of the shaft 146 so that it will be necessary for a higher temperature to be reached in the vicinity of the bulb 137 before the expansible fluid therein will cause the valve in the housing 136 to start closing, which action will be well understood by those skilled in the art.

The hot water after passing through the valve housing 136 flows through pipe 148 down into the heat radiating member 40 in the underseat heater, and after passing through this member returns to the engine cooling circulating system through the pipe 150 which is connected to the inlet side of the water pump 152.

Located in the tube 34 is a pivoted valve 154, the position of which may be adjusted by the following mechanism. 155 is a shaft journalled at one end in a bracket 156 secured to the casing section 52 and in the other end in the face plate 100 of the housing 96, there being a control knob 188 secured on the latter end of this shaft. 180 is a lever secured on the shaft near the other end thereof, there being a coil spring 162 located between this lever and the bracket 156 for the purpose of holding the shaft in adjusted position and preventing rattling of the parts. Secured to the end of the lever is a fitting 164 having a hole 166 formed in it, in which hole is received the end of a Bowden wire 168, the wire being clamped in the hole by a screw 170 threaded into the fitting. The other end of the Bowden wire is connected to a lever 172 secured to the valve 154, so that turning of the control knob 158 in a clockwise direction to the "off" position marked on the face plate 100 as shown in Figure 2, will move the valve 154 to a position wherein it will close the passageway in the tube 34 so that no air will be allowed to flow to the heater, all of the air entering the tube therefore having to flow into the casing 48. When the knob 158 is turned to the "on" position, the valve 154 is moved to open position so that some of the air flowing through the tube 34 may enter the underseat heater casing 42.

The shaft 155 has another lever 174 secured to it, and a bent-over portion 176 on a link 178 extends through a hole in the outer end of this lever. At the other end of the link another bent-over portion 180 fits into a hole formed in the outer end of a lever 182. The inner end of this lever has a hole formed in it, and shaft 98 extends through this hole so that it is free to rotate relative to the lever. Secured to shaft 98 is an arm 181 having a bent over portion 183 which, when the knob 102 is turned in a counterclockwise direction to the "de-ice" position, will engage the edge of the lever 182 and will swing it to the dotted line position shown in Fig. 6, and since the lever 182 is connected by link 178 to lever 174, the latter will likewise be swung to the dotted line position shown in Fig. 6. This will cause the shaft 155 to be rotated in a clockwise direction to a position wherein the Bowden wire 168 will move the valve 154 to a point wherein it will nearly close the passageway in the tube 34 so that substantially all of the air flowing through the tube will pass through the tube 92 into the casing 48. At this time the arrow on knob 158 will point to "off" position on the face plate. It will be understood that when levers 174 and 182 and link 178 are in the full line position shown in Fig. 6, the knob 158 will be set to the "on" position, and that they are swung to the dotted line position in that figure when knob 102 is turned to "de-ice" position by the engagement of portion 183 with the lever 182 as described above.

The rotative movement of the knob 102 and shaft 98 in a counterclockwise direction is limited by portion 183 on arm 181 engaging a projection 185 extending from a stamping 187 secured to the rear side of the face plate. Rotation in the opposite direction is limited by portion 183 striking an angularly inclined projection 189 extending from stamping 187 on the other side of shaft 98. 191 is a compression spring surrounding shaft 98 and extending between the rear side of the face plate and lever 182, thereby forcing the latter against arm 181 to hold it in proper position and to prevent rattling of the parts.

It will be seen that because of the fact that arm 182 is loosely mounted on the shaft and is only moved by counterclockwise rotation of knob 102 when portion 183 on arm 181 engages it, rotation of knob 158 will not change the position of knob 102 when the latter is in either the "off" or "normal" position, because when the knob is in either of those positions, the portion 183 on arm 181 will be swung up to a position wherein it cannot be engaged by lever 182. In other words, the connection between arm 181 and lever 182 is a type of lost motion connection wherein one drives the other only through a portion of its range of movement.

184 is a switch mounted in the face plate 100 of the housing 96 serving to control the operation of the electric motor 28 which drives the blower 26 located at the front end of the tube, 186 and 188 being the wires which lead to the motor and to the battery. Another switch 190 mounted in the face plate controls a light (not shown) which is located under the instrument panel and above the face plate to illuminate the controls at night. 192 and 194 are the wires leading from this switch to the battery and to the light.

In the upper part of the casing 48 there are tubular projections 196 formed in each of the side walls, and as shown in Figure 1 flexible conduits 198 connected to these projections conduit air from the casing up to nozzles 200 located at the inside lower edge of each of the windshield sections 12.

In the operation of the device, when it is desired to heat the interior of the car body, the control knob 142 is set to the position which it is estimated will provide the desired temperature to be reached, and the knob 158 is set to "on" position which opens the valve 154 permitting air entering the tube 34 due to the forward movement of the car to flow into the underseat heater, from which after becoming heated, the air flow into the spaces in front of and behind the front seat. At the same time some of the air being forced into the tube 34 flows up through the tube 92 into the lower part of the casing 48. Under normal cold weather conditions the windshield can be defrosted simply by discharging unheated air against it. To do this, the knob 102 is set to the position marked "normal" on the face plate and this through rotation of the shaft 98 and cam 104 opens the damper 78, which permits the air entering the casing to flow up through the passageway 68 and out through the projections 196 and thence through the tubes 198 and nozzles 200 to the windshield sections. At this time the damper 76 will be held closed by the spring 114 so that none of the air entering the casing will flow through the heat radiating member 62. The air being discharged from the nozzles 200 being unheated will serve to ventilate the interior of the car body, as well as to defrost the windshield, it insuring an adequate supply of fresh air from outside the vehicle without creating drafts as would be the case were the vehicle windows opened.

If it should be desired to utilize heated air for defrosting purposes, as when frost or ice form on the windshield, the knob 102 is turned to the position marked "de-ice" on the face plate. This allows the valve 78 to close and opens the valve 76 so that all the air entering the casing must flow through the heat radiating member 62 before being discharged against the windshield. Adjustment of the knob 102 to this position causes the link 178 and associated levers to rotate the shaft 155 whereby the valve 154 will be moved to nearly closed position in order that most of the air entering the tube 34 will flow up through the casing 48 and through the heat radiating member 62 to the windshield. In other words, the valve 154 is automatically moved to nearly closed position when the greatest amount of heated air is needed to quickly remove frost or ice from the windshield. The reason it is not moved to entirely closed position at this time is that it is desired to have some air flowing through the underseat heater to heat the interior of the car body.

If some air is desired for either heating, defrosting or ventilating purposes, than is being forced into the tube 34 by the forward movement of the car, such as when the vehicle is moving slowly or is standing still, the switch 184 may be turned to "on" position which will start the electric motor 28 in operation to drive the blower 26, which will force air through the tube 34 into either or both the underseat heater and the casing 48. If a higher temperature for either heating or defrosting purposes is desired, rotation of the knob 142 toward the position marked "high" on the face plate will keep the water flow control valve 136 to stay open longer so that more hot water from the engine cooling circulating system will flow through both the heat radiating members 40 and 62, while rotation of the knob 142 in the opposite direction will cause it to start closing earlier to reduce the flow of hot water, thereby keeping the temperature lower. In other words, it is possible by setting the control knob 142 to the proper position, to maintain any desired temperature inside the body compartment whenever the engine is being operated.

When the control knob 102 is set to the "off" position indicated on the face plate, both of the dampers 76 and 78 will be in closed position, as shown in Figure 3. This will prevent any of the air flowing through the tubes 34 and 92 from passing either through the heat radiating member 62 or through the passageway 68 and thence into the car through the nozzles 200. This is particularly advantageous when the vehicle is passing through an area where there are noxious odors present, as such odors may thus be excluded from the interior of the vehicle body. At such times the control knob 158 is moved to the "off" position marked on the face plate, in which position the valve 154 in the tube 34 will be completely closed, so that none of the outside air entering the tube 34 will be permitted to flow through the underseat heater.

It will be seen from the above that we have devised a structure which may be utilized in a variety of ways to heat or ventilate the interior of the body compartment or to defrost the windshield. Under normal conditions when the vehicle is moving in a forward direction, a sufficient supply of air for these purposes is obtained solely as a result of such movement so that it is not necessary to operate the blower, but when for any reason a greater supply of air is desired, it may be obtained by turning on the blower. The temperature within the body compartment may be automatically maintained at any desired point by adjusting the position of the water flow control valve, and either heated or unheated air may be utilized for ventilating the interior of the vehicle or defrosting the windshield. Also when the greatest amount of air is needed for quickly removing ice or frost from the windshield, the supply of air to the underseat heater is automatically reduced to insure that most of the air entering the vehicle is utilized for such defrosting purpose. A further advantage of the construction is that under none of the various types of operating conditions possible is there any recirculation of the air within the body compartment, fresh air from outside the vehicle being provided at all times.

While the invention is susceptible of various modifications and alternative constructions, we have shown in the drawings and have described in detail the preferred embodiment, but it is to be understood that we do not thereby intend to limit the invention to the specific form disclosed, but intend to cover all modifications and alternative constructions falling within the spirit and scope of the invention as expressed in the appended claims.

We claim:

1. In a motor vehicle, the combination of a heater located inside the vehicle, a tube adapted to conduct air from ouside the vehicle to the heater, a casing located inside the vehicle, a conduit leading from said tube to said casing, a valve associated with the tube operable to regulate the amount of air admitted to the heater, a heat radiating member located within said casing, dampers located within said casing adapted to be adjusted to cause air entering the casing to flow either through or around the heat radiating member therein, means for controlling the position of said dampers, said means being connected to said valve in such manner that when the dampers are adjusted to cause the air entering the casing to flow through the heat radiating member, said valve will be moved to a position wherein substantially all of the air passing through the tube will flow through the conduit and the said casing, and tubes adapted to conduct air from said casing to the lower inside edge of the vehicle windshield.

2. In a motor vehicle, the combination of an underseat heater, a casing located inside the vehicle, a heat radiating member within said casing, conduit means adapted to conduct air from the front end of the vehicle into both said underseat heater and said casing, a valve associated with said conduit means operable to vary the amount of air flowing into said heater and said casing, adjustable dampers in said casing adapted to cause the air entering therein to flow either through or around the heat radiating member, a member connecting said valve with said adjustable dampers whereby when the latter are set to a position will cause the air entering the casing to flow through the heat radiating member, the valve will be moved to a position which will shut off the flow of air to the underseat heater, and tubes adapted to conduct air from the casing to a point at the lower inside edge of the windshield.

3. In a motor vehicle, the combination of an underseat heater, a casing located within the vehicle, tubing adapted to conduct air from the front end of the vehicle into both the underseat heater and the casing, a valve associated with the conduit means operable to regulate the amount of air admitted to the underseat heater, a heat radiating member located within said casing, a pair of adjustable dampers in said casing, said dampers when set in one position causing the air entering the casing to flow through the heat radiating member and when set in the opposite position causing the air to flow around the heat radiating member, means connecting said valve with said dampers whereby when the latter are set to the position wherein the air entering the casing is caused to flow through the heat radiating member, said valve will be set to a position which will cause all of the air passing through the tubing to flow into the casing, and a pair of tubes adapted to conduct air from the casing to the lower inside edge of the windshield.

4. In a motor vehicle, the combination of a heater located inside the vehicle, a tube adapted to conduct air from outside the vehicle to the heater, a casing located inside the vehicle, a conduit leading from said tube to the casing, a valve associated with the tube operable to regulate the amount of air admitted to the heater, a heat radiating member located within the casing, dampers located within said casing adapted to be adjusted to cause air entering the casing to flow either through or around the heat radiating member therein, a control for changing the position of said dampers, a second control adapted to change the position of said valve, said valve control being so connected with the damper control that when the latter is set to a position wherein the air entering the casing is caused to flow through the heat radiating member, said valve will be moved to a position wherein substantially all of the air passing through the tube will flow into said casing, and tubes adapted to conduct air from said casing to the lower inside edge of the vehicle windshield.

ARTHUR J. SCHUTT.
WILLIAM J. DE BEAUBIEN.